United States Patent
Schneider, II et al.

(10) Patent No.: US 9,552,706 B2
(45) Date of Patent: Jan. 24, 2017

(54) COLOR CHANGING BACKLIGHT FOR FLUID DELIVERY DEVICES DISPLAYING TEMPERATURE

(71) Applicant: Delta Faucet Company, Indianapolis, IN (US)

(72) Inventors: Randy Schneider, II, Carmel, IN (US); Scott Collevechio, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 14/609,035

(22) Filed: Jan. 29, 2015

(65) Prior Publication Data

US 2015/0221206 A1 Aug. 6, 2015

Related U.S. Application Data

(60) Provisional application No. 61/934,371, filed on Jan. 31, 2014.

(51) Int. Cl.
*G08B 17/00* (2006.01)
*G08B 5/36* (2006.01)
(Continued)

(52) U.S. Cl.
CPC .............. *G08B 5/36* (2013.01); *E03C 1/0404* (2013.01); *E03C 1/055* (2013.01); *G01K 13/02* (2013.01);
(Continued)

(58) Field of Classification Search
CPC ....... G01K 3/005; G01K 13/02; E03C 1/0404; E03C 2001/0418; Y10T 137/8158; Y10T 137/9464
(Continued)

(56) References Cited

U.S. PATENT DOCUMENTS 4,281,543 A 8/1981 Raz
4,420,811 A 12/1983 Tarnay et al.
(Continued)

FOREIGN PATENT DOCUMENTS

CN 201124130 Y 10/2008
CN 201683802 U 12/2010
(Continued)

OTHER PUBLICATIONS

The Case for Light: Cutting-edge Light Technology Delivers Tangible Benefits in a Stylish Package; http://www.digital.bnpmedia.com/article/Decoration/483532/45749/article.html; Sep. 2010.
LCD Shower Digital Shower Screen Color Changed by Water Temperature Bathing Faucet Temperature Display Showerhead 20 pcs/lot; http:www.aliexpress.com/item/LCD-shower-digital-shower-screen-color-changed-by-water-temperature-bathing-faucet-temperature-display-showerhead-20/587678191.html; 2014.

*Primary Examiner* — John A Tweel, Jr.
(74) *Attorney, Agent, or Firm* — Faegre Baker Daniels LLP

(57) ABSTRACT

A display unit for a fluid delivery device which outputs water includes a printed circuit board, a diffuser supported by the printed circuit board, and a display screen electrically coupled to the printed circuit board. The display unit further includes a first light source electrically coupled to the printed circuit board, and a second light source electrically coupled to the printed circuit board. The first and second light sources define backlighting for the display screen. Operation of the first and second light sources is adjusted in response to a change in temperature of the output water of the fluid delivery device.

16 Claims, 13 Drawing Sheets

(51) Int. Cl.
*E03C 1/04* (2006.01)
*G01K 13/02* (2006.01)
*E03C 1/05* (2006.01)

(52) U.S. Cl.
CPC ...... *E03C 1/0408* (2013.01); *E03C 2001/0418* (2013.01); *Y10T 29/49002* (2015.01); *Y10T 137/9464* (2015.04)

(58) Field of Classification Search
USPC ............... 340/584; 137/551; 4/605; 374/147
See application file for complete search history.

(56) References Cited

U.S. PATENT DOCUMENTS

| | | |
|---|---|---|
| 5,172,860 A | 12/1992 | Yuch |
| 5,535,779 A | 7/1996 | Huang |
| 5,725,010 A | 3/1998 | Marty et al. |
| 5,963,280 A | 10/1999 | Okuda et al. |
| 6,029,094 A | 2/2000 | Diffut |
| 6,519,790 B2 | 2/2003 | Ko |
| 6,892,952 B2 | 5/2005 | Chang et al. |
| 7,124,452 B1 | 10/2006 | Bauza |
| 7,350,973 B2 | 4/2008 | Craig et al. |
| 7,406,722 B2 * | 8/2008 | Fukuizumi ........... A47K 5/1217 4/623 |
| 7,818,830 B2 | 10/2010 | Thorne et al. |
| 8,065,759 B2 | 11/2011 | Smushkovich et al. |
| 8,089,473 B2 | 1/2012 | Koottungal |
| 8,347,427 B2 | 1/2013 | Klicpera |
| 8,469,054 B2 | 6/2013 | Lang et al. |
| 2003/0156620 A1 | 8/2003 | Wang |
| 2003/0202558 A1 | 10/2003 | Chung et al. |
| 2006/0045167 A1 | 3/2006 | Pawlenko et al. |
| 2006/0203880 A1 | 9/2006 | Batcho |
| 2006/0231140 A1 | 10/2006 | McNerney |
| 2008/0163641 A1* | 7/2008 | Mitchell ............... B67D 1/0875 62/389 |
| 2009/0106891 A1 | 4/2009 | Klicpera |
| 2009/0108223 A1 | 4/2009 | Deutsch et al. |
| 2011/0005619 A1 | 1/2011 | Kanemaru et al. |
| 2011/0068192 A1 | 3/2011 | Klicpera |
| 2011/0209782 A1 | 9/2011 | Yao |
| 2013/0299016 A1 | 11/2013 | Lee |
| 2013/0312856 A1 | 11/2013 | Huffington et al. |

FOREIGN PATENT DOCUMENTS

| | | |
|---|---|---|
| CN | 201760356 U | 3/2011 |
| GB | 2453871 A | 4/2009 |
| KR | 452641 Y1 | 3/2011 |
| WO | WO 2011/091595 | 8/2011 |

\* cited by examiner

COLOR CHANGING BACKLIGHT FOR FLUID DELIVERY DEVICES DISPLAYING TEMPERATURE

CROSS-REFERENCE TO RELATED APPLICATIONS

The present application claims priority to U.S. Provisional Patent Application Ser. No. 61/934,371, filed on Jan. 31, 2014, and is related to U.S. patent application Ser. No. 13/894,859 filed on May 15, 2013, the complete disclosures of which are expressly incorporated by reference herein.

BACKGROUND AND SUMMARY OF THE INVENTION

The present invention relates generally to a user interface for fluid delivery devices and, more particularly, to a display unit with a variable backlight which changes in response to a change in water temperature.

Fluid delivery devices may be used in both kitchen and bath applications. For example, a fluid delivery device for a kitchen application may include a faucet and/or a sprayer for use at a kitchen sink. Additionally, a fluid delivery device for a bath application may include a showerhead, a hand shower or sprayer, a tub faucet, and/or a lavatory faucet. Each fluid delivery device may include a user interface to control the flow and temperature of outlet water from the fluid delivery device. The user interface may also include a display unit to indicate various parameters and properties of the fluid delivery device, for example, water temperature, operating mode, current time and date, and/or other information about the fluid delivery device.

The present disclosure relates to a fluid delivery device which includes a display unit for indicating at least the temperature of the water delivered therefrom. The display unit may be configured to illuminate a portion of the display unit when indicating the water temperature. More particularly, the illustrative display unit may be configured with backlighting which changes color in response to the outlet water temperature.

According to an illustrative embodiment of the present disclosure, a display unit for a fluid delivery device which outputs water comprises a printed circuit board, a diffuser supported by the printed circuit board, and a display screen electrically coupled to the printed circuit board. The display unit further comprises a first light source electrically coupled to the printed circuit board, and a second light source electrically coupled to the printed circuit board. The first and second light sources define backlighting for the display screen. Operation of the first and second light sources is adjusted in response to a temperature of the output water of the fluid delivery device.

According to a further illustrative embodiment of the present disclosure, a fluid delivery device configured to output water comprises a temperature sensor for detecting temperature of the output water, a controller electrically coupled to the temperature sensor, and a display unit electrically coupled to the controller. The display unit includes a first light source configured to be operated by the controller to adjust backlighting of the display unit. The controller is configured to receive a signal from the temperature sensor and send at least one signal to the first light source in response to the signal from the temperature sensor.

According to another illustrative embodiment of the present disclosure, a method of controlling a backlighting output on a fluid delivery device configured to deliver water comprises the steps of providing a display unit on the fluid delivery device, electrically coupling a first light source defining a first color to the display unit, and electrically coupling a second light source defining a second color to the display unit. The method further comprises the steps of providing a controller configured to adjust an output of the first and second light sources, and sending a first signal from the controller to the first light source to adjust the backlighting output of the fluid delivery device to the first color when a temperature of the water is less than a first temperature. Additionally, the method comprises the step of sending a second signal from the controller to at least the second light source to adjust the backlighting output of the fluid delivery device to include the second color when the temperature of the water is greater than the first temperature.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

With reference to FIGS. 1-4, an illustrative fluid delivery device 10 is configured to supply hot and/or cold water through a hot water supply (not shown), a cold water supply (not shown), and a valve assembly (not shown). In one embodiment, the operating temperature of fluid delivery device 10 may be from approximately 60° F. to approximately 130° F., and more particularly, from approximately 80° F. to approximately 110° F.

Figure 13:
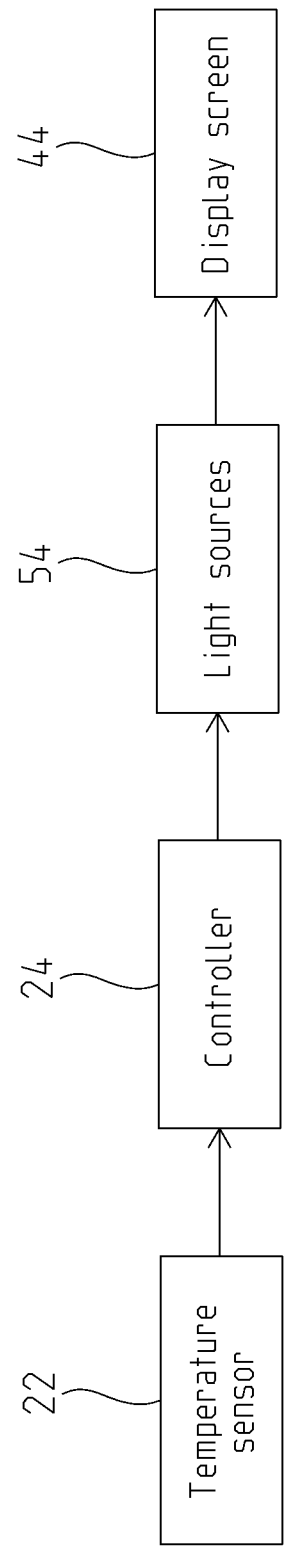
FIG. 13 is a diagrammatic view of the fluid delivery device of the present disclosure, illustrating a plurality of inputs and at least one output.

Fluid delivery device 10 may be operably coupled to a user interface 16 which includes a user input 18 in order to modify or adjust the output of water through operation of the valve assembly, as detailed further herein. Additionally, user interface 16 may include a display unit 20 to indicate various parameters or information about fluid delivery device 10 to a user. For example, display unit 20 may be a liquid crystal display ("LCD") configured to output the temperature of the water, the operating mode, the current time and/or date, and/or any other information about fluid delivery device 10. In one embodiment, an operating voltage of display unit 20 may be approximately 1.0-10.0 V, and more particularly 3.0-5.0 V, for example 4.8 V. Display unit 20 may be powered through a battery (not shown), or alternatively, may be hard-wired to an electrical system. Additional embodiments of display unit 20 may be powered through alternative energy sources, for example display unit 20 may be hydro-powered. In order to output information to the user, fluid delivery device 10 is operably coupled to at least a temperature sensor 22, for example a thermistor, and a controller 24, as shown in FIG. 13. In one embodiment, controller 24 may be a microprocessor electrically coupled with temperature sensor 22 via a cable and/or an electrical connector (not shown).

Figure 1:
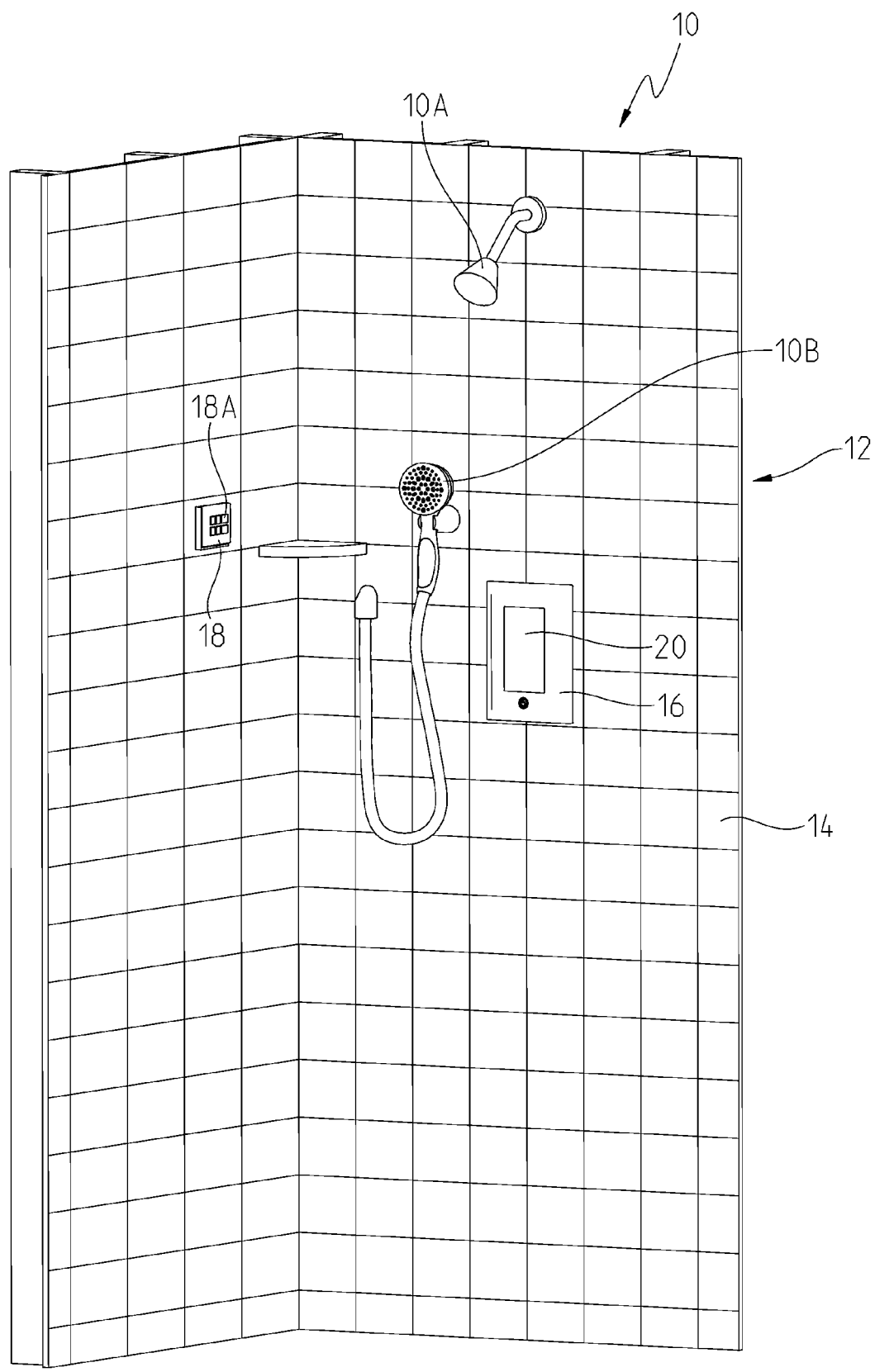
FIG. 1 is a partial front perspective view of a portion of a shower enclosure with a showerhead, a hand shower, and a display unit of the present disclosure.
Figure 2:
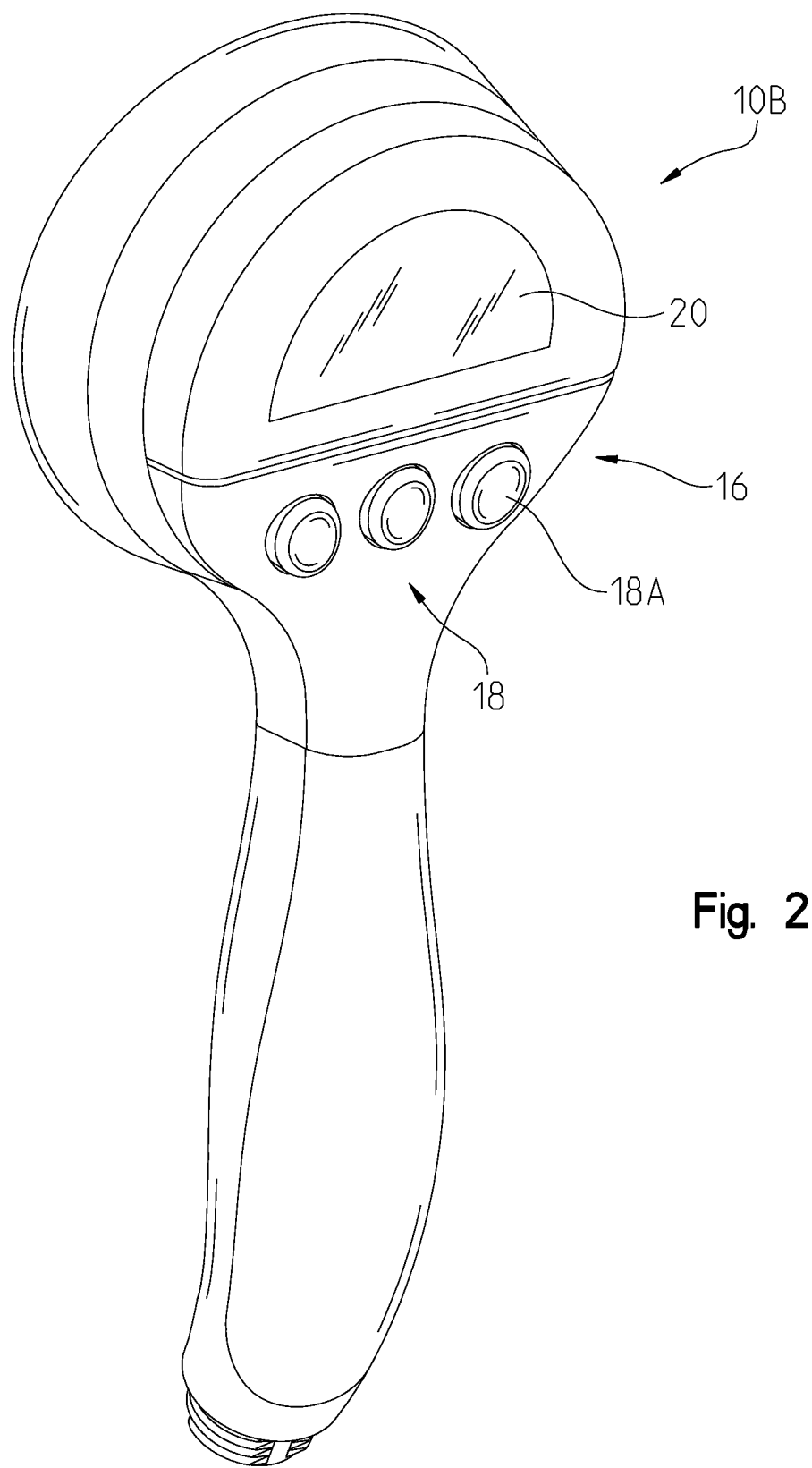
FIG. 2 is a rear perspective view of the display unit coupled to the hand shower of FIG. 1.

Illustratively, fluid delivery device 10 may be supported in a shower enclosure 12 and define a showerhead 10A supported on a wall 14 of shower enclosure 12, as shown in FIG. 1. Additionally, fluid delivery device 10 may define a hand shower or hand sprayer 10B supported on wall 14 of shower enclosure 12, as also shown in FIGS. 1 and 2.

Figure 3:
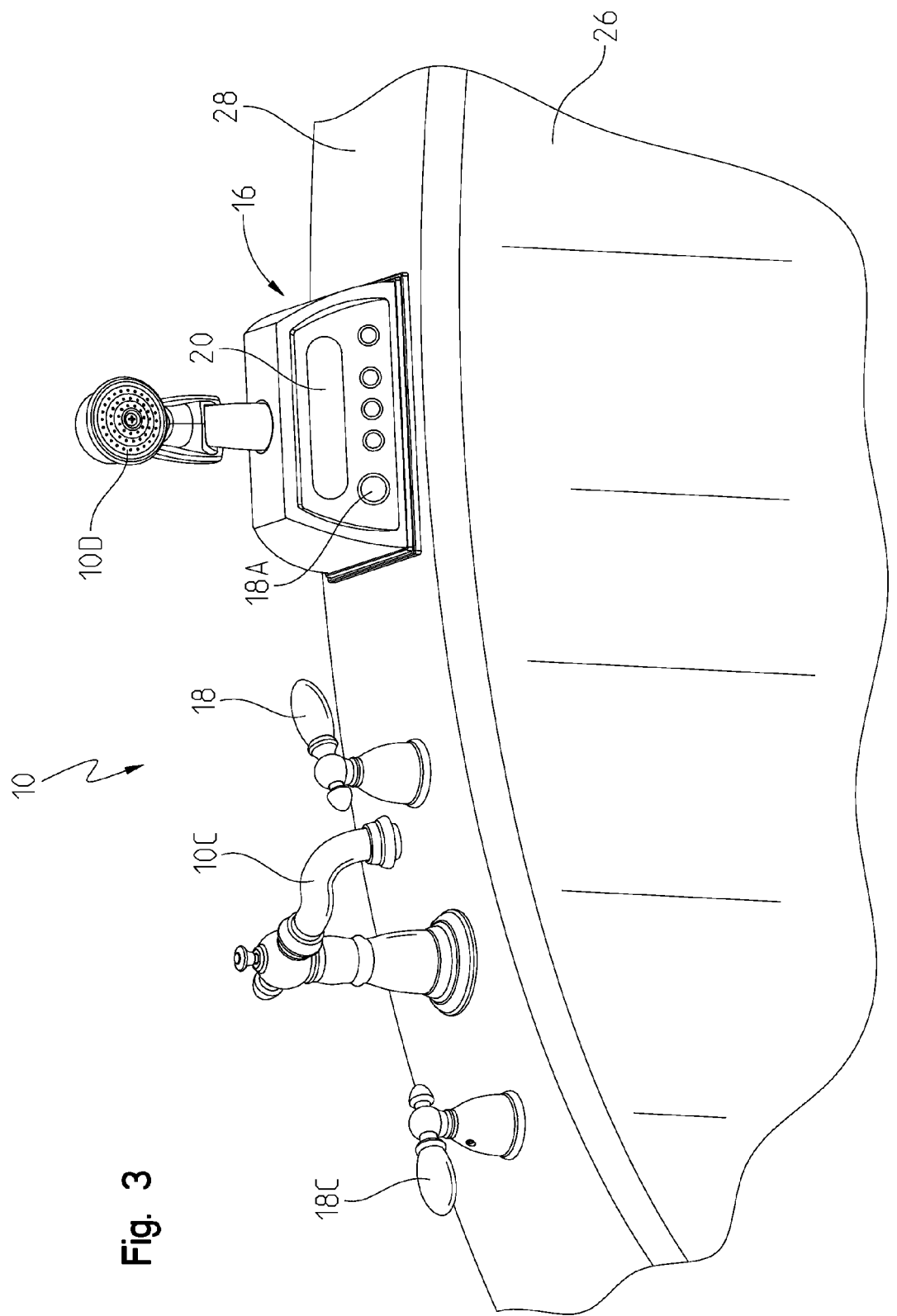
FIG. 3 is a partial front perspective view of a portion of a tub, a faucet, a hand sprayer, and an alternative embodiment of the display unit of FIG. 1.

Alternatively, as shown in FIG. 3, fluid delivery device 10 may be supported on a tub 26 and define a tub faucet 10C positioned on an upper surface 28 of tub 26. Additionally, fluid delivery device 10 may define a tub sprayer 10D supported on upper surface 28 of tub 26.

Figure 4:
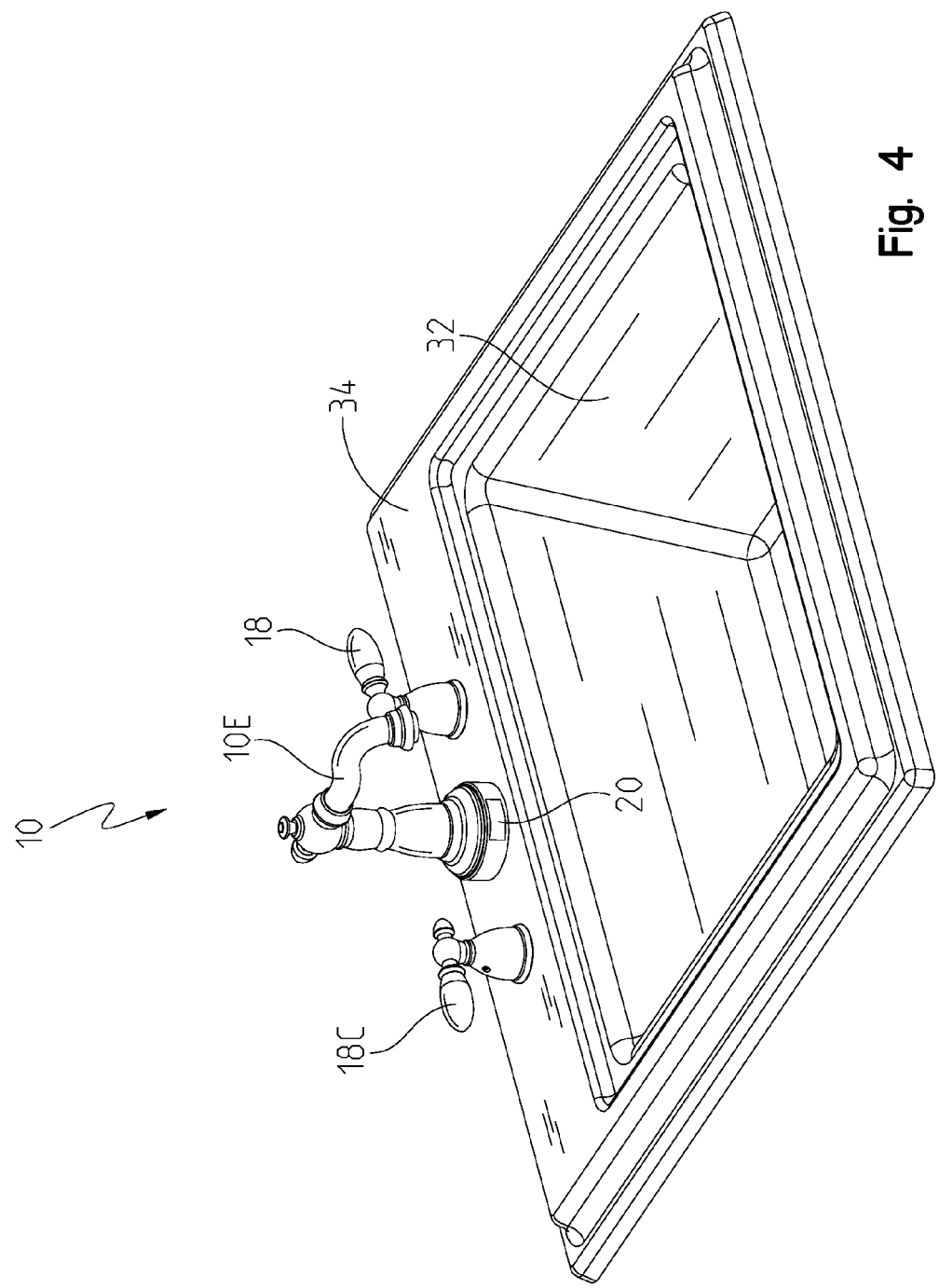
FIG. 4 is a partial front perspective view of a portion of a kitchen sink and faucet with an alternative embodiment of the display unit of FIG. 1.

FIG. 4 illustratively shows a further alternative embodiment of fluid delivery device 10. More particularly, fluid delivery device 10 may be supported on a lavatory or kitchen sink 32 and define a lavatory or kitchen faucet 10E positioned on a base surface 34 of sink 32.

Figure 5:
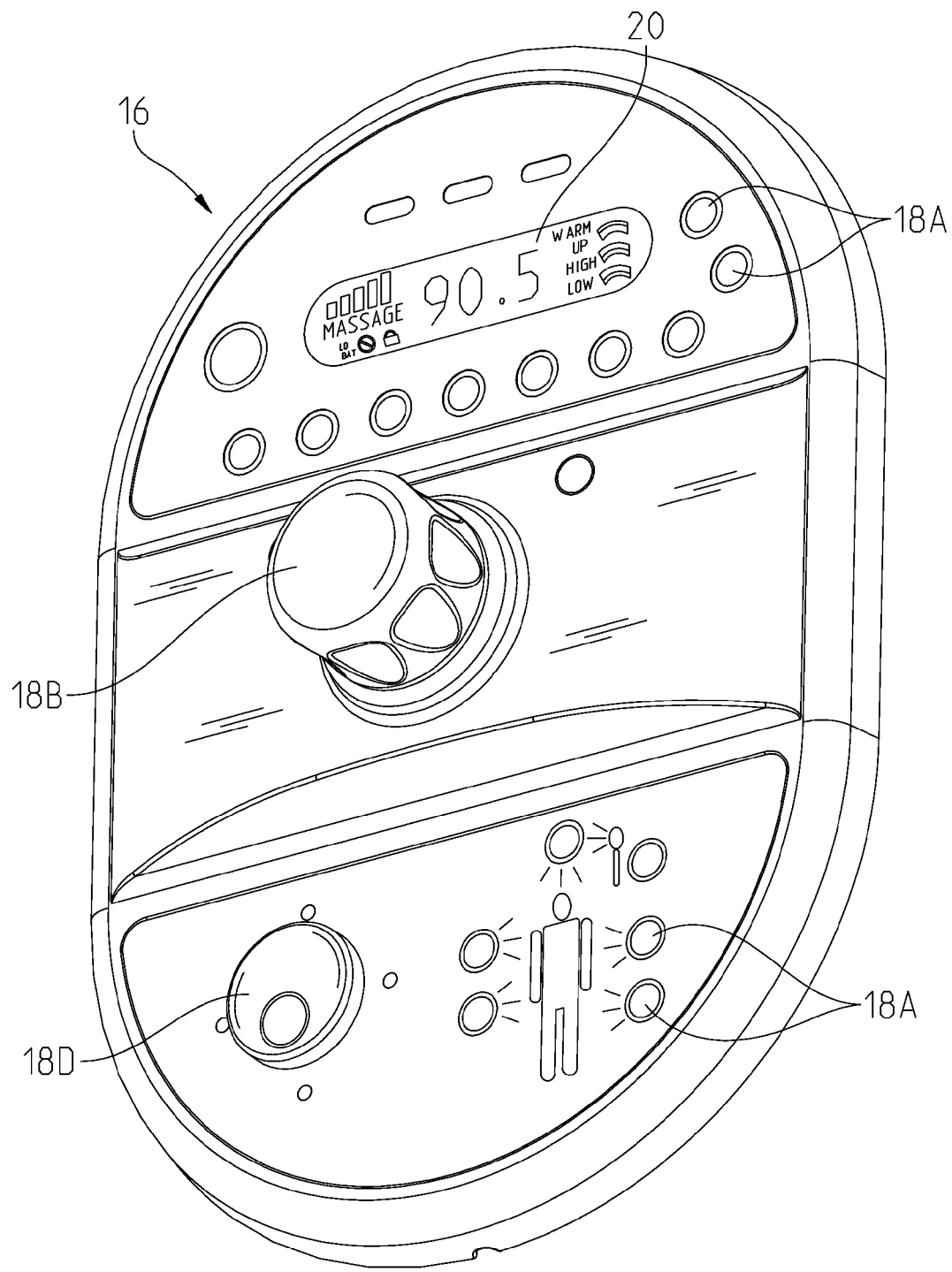
FIG. 5 is an illustrative embodiment of a user interface including an embodiment of the display unit of FIG. 1.
Figure 6:
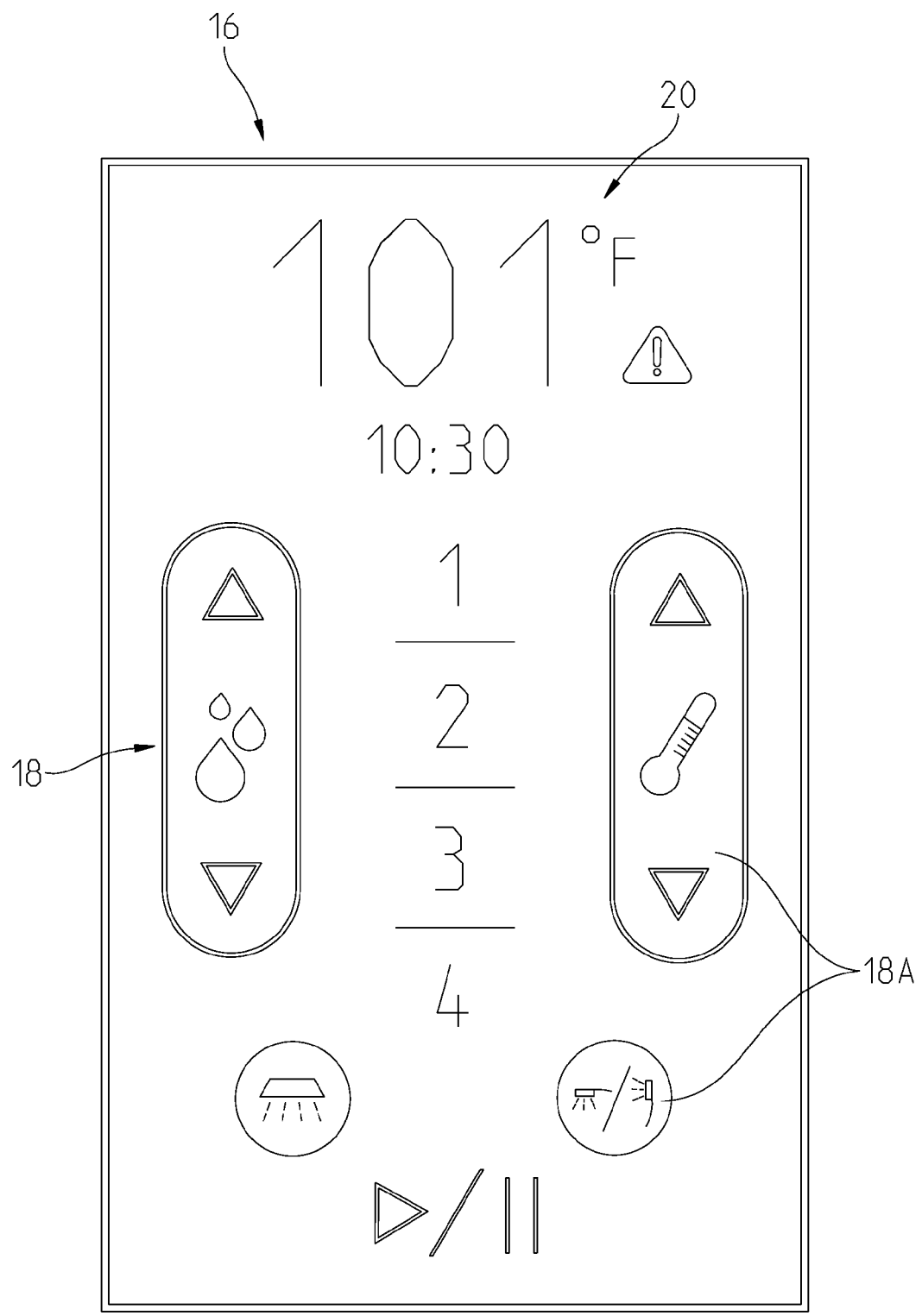
FIG. 6 is an alternative embodiment of the user interface of FIG. 5, including an embodiment of the display unit of FIG. 5.
Figure 7:
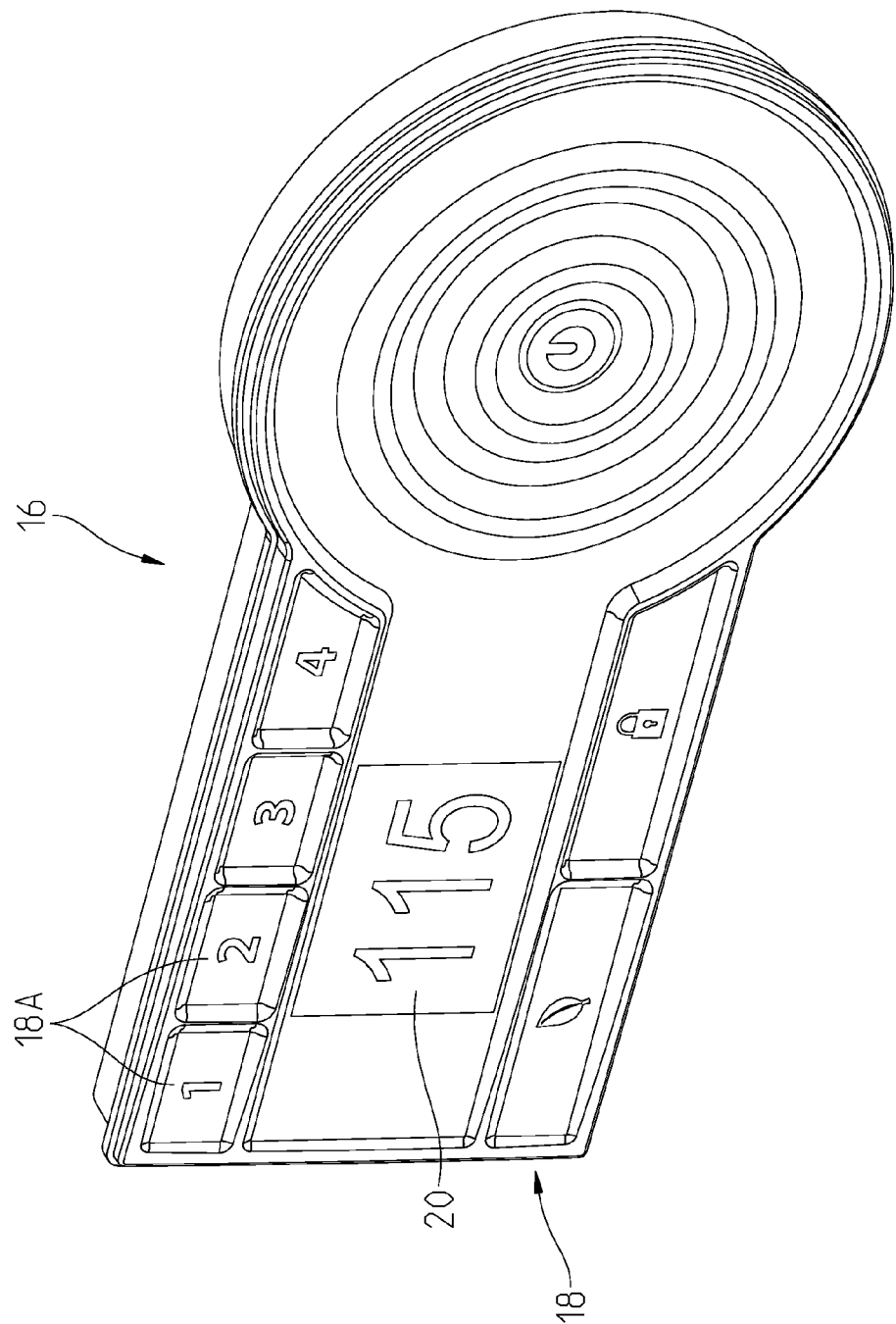
FIG. 7 is an alternative embodiment of the user interface of FIG. 5, including an embodiment of the display unit of FIG. 5.

Referring to FIGS. 1-7, user interface 16 of fluid delivery device 10 includes user input 18 which may define various embodiments, such as a push button, knob, handle, lever, dial, or any other input device. For example, as shown in FIGS. 1-3 and 5-7, user input 18 may define at least one push button 18A electrically coupled to controller 24 (FIG. 13) and supported on fluid delivery device 10. Alternatively, as shown in FIG. 5, user input 18 may define a knob 18B or dial 18D, which are configured to be rotated or otherwise moved by a user to adjust or change various parameters of fluid delivery device 10. In a further alternative embodiment, as shown in FIGS. 3 and 4, user input 18 may define a handle or lever 18C, which is configured to rotate, pivot, or otherwise move in order to change various parameters of fluid delivery device 10.

In operation, user input 18 is operably coupled to the valve assembly (not shown) to control the input from the hot and cold water supplies (not shown). Additionally, user input 18 may be configured to control the output mode of fluid delivery device 10. For example, through user input 18, a user may choose a spray or stream mode for fluid delivery device 10.

Figure 8:
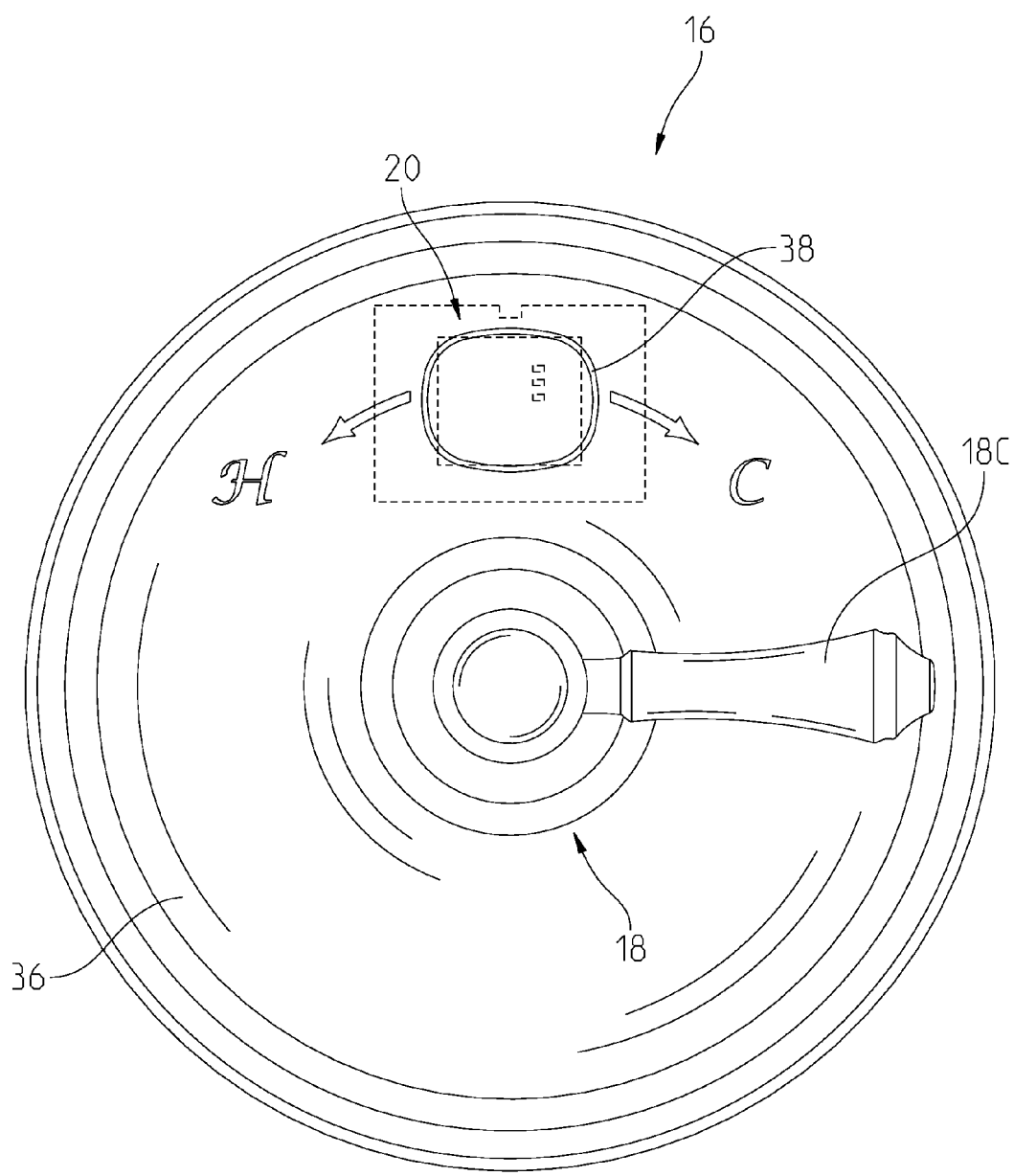
FIG. 8 is a front elevational view of an alternative embodiment of the user input of FIG. 5, including the display unit of the present disclosure.

Referring now to FIGS. 1-9, user interface 16 further includes display unit 20, which may be supported on fluid delivery device 10. For example, as shown in FIG. 2, one embodiment of display unit 20 may be supported on hand shower 10B. Alternatively, a further embodiment of display unit 20 may be supported on tub 26 and/or tub sprayer 10D, as shown in FIG. 3. In a further embodiment, an embodiment of display unit 20 may be supported on a portion of faucet 10E and/or base surface 34 of sink 32. Additionally, as shown in FIGS. 1 and 8, an embodiment of display unit 20 may be provided for shower applications and supported on wall 14 of shower enclosure 12.

Referring to FIG. 8, illustrative user interface 16 of the present disclosure may be supported on shower enclosure 12 and includes user input 18, illustratively handle 18C, and display unit 20. An escutcheon or cover 36 also may be supported on shower enclosure 12 and conceal a portion of display unit 20. Escutcheon 36 may include a lens cover 38 to seal display unit 20 from the water delivered from fluid delivery device 10.

Figure 11:
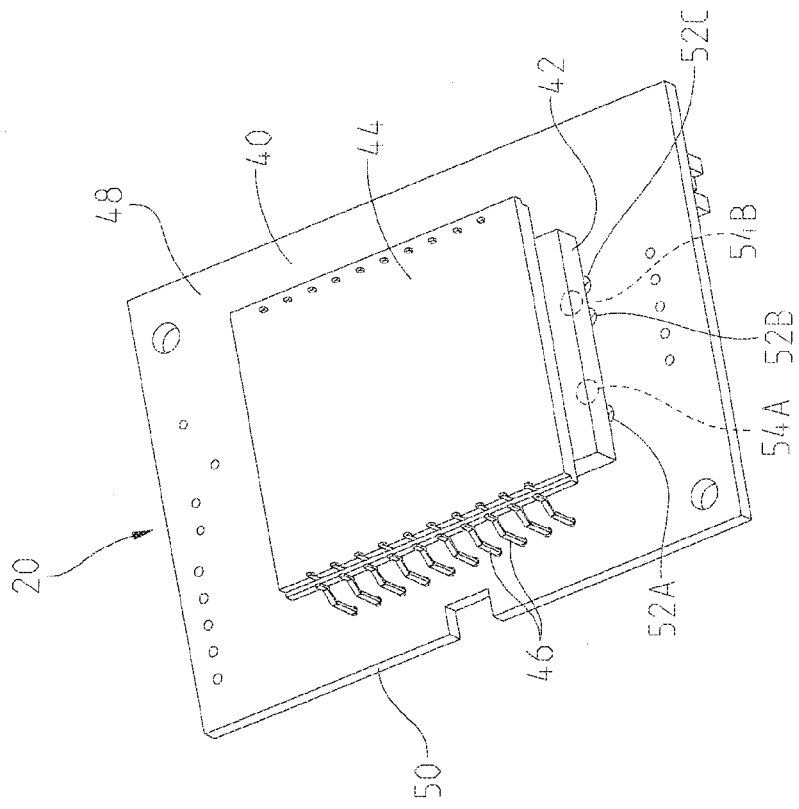
FIG. 11 is a top perspective view of the display unit of FIG. 9.
Figure 12:
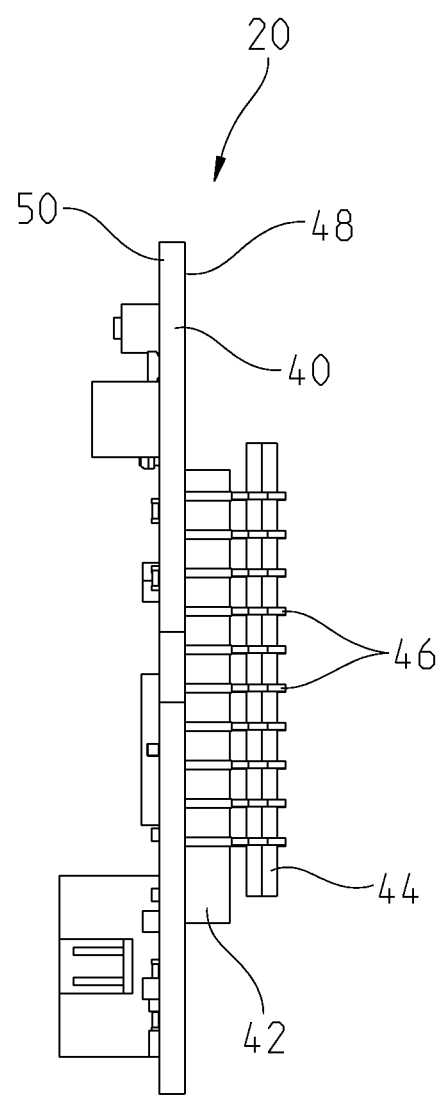
FIG. 12 is a side elevational view of the display unit of FIG. 9.

As shown in FIGS. 9-12, display unit 20 is electrically coupled to controller 24 (FIG. 13) and includes a printed circuit board 40, a translucent block or diffuser 42, and a display screen 44, illustratively a liquid crystal display ("LCD") screen. In one embodiment, display screen 44 is segmented LCD screen. Diffuser 42 may be comprised of glass, an acrylic polymer, or other translucent materials and is positioned intermediate display screen 44 and printed circuit board 40. As shown in FIGS. 11 and 12, display screen 44 is electrically coupled to printed circuit board through at least a plurality of pins 46. More particularly, pins 46 extend through a top or front surface 48 of printed circuit board 40 in order to couple with display screen 44. Each pin 46 may be configured to control a particular segment or portion of display screen 44. For example, each pin 46 may be configured to illuminate a portion or segment of a symbol (e.g., an alphanumeric symbol, battery symbol) shown on display unit 20 such that the portion or segment of the symbol is visible to the user. Exemplary symbols may indicate water temperature, water flow rate, operating mode, a date, a time, or any other parameter or information about fluid delivery device 10.

Figure 9:
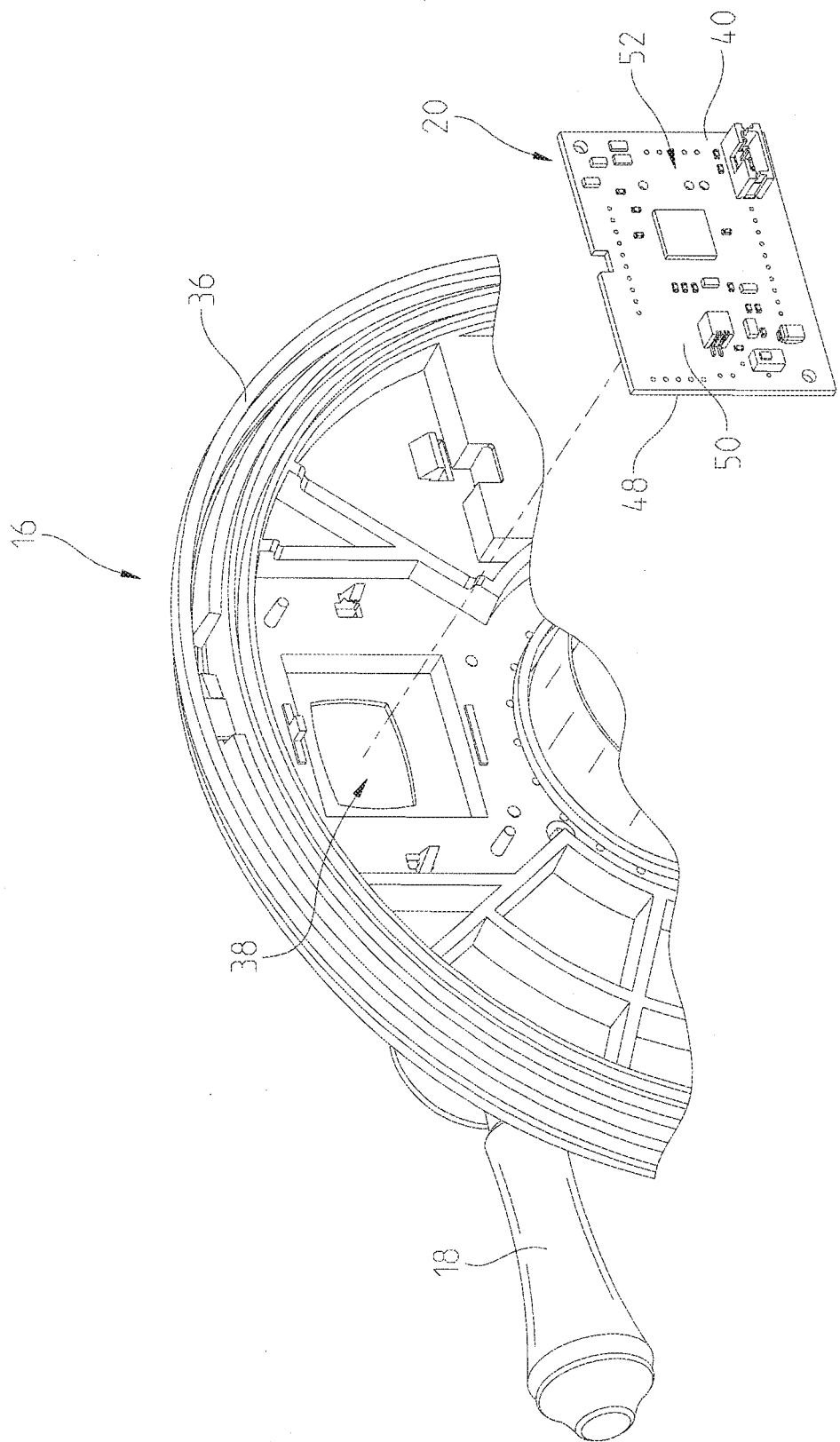
FIG. 9 is a rear exploded perspective view of the user interface and display unit of FIG. 8.
Figure 10:
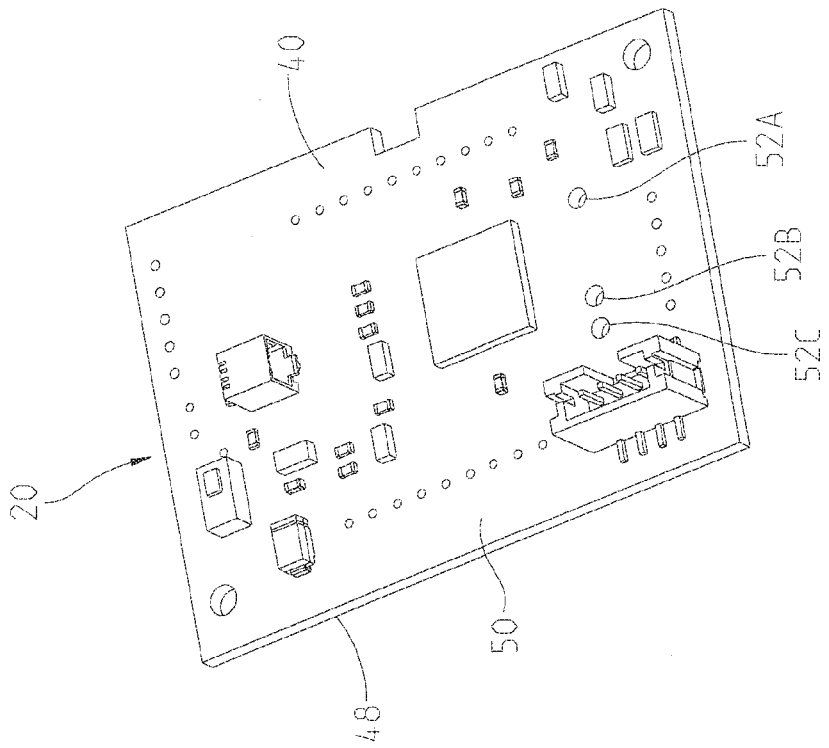
FIG. 10 is a bottom perspective view of the display unit of FIG. 9.

Generally opposite front surface 48 of printed circuit board 40 is a bottom or rear surface 50 of printed circuit board 50. As shown in FIGS. 9 and 10, rear surface 50 includes a plurality of terminal holes or openings 52 for terminals electrically coupled a plurality of light sources 54 (FIG. 11). More particularly, as shown in FIGS. 10 and 11, terminal holes 52 include a first terminal hole 52A for a first light ground terminal (not shown) electrically coupled to a first light source 54A, a second terminal hole 52B for a second light ground terminal (not shown) electrically coupled to a second light source 54B, and a third terminal hole 52C for a common power terminal (not shown) electrically coupled to both first and second light sources 54A and 54B. Alternatively, terminal holes 52 may be configured for a first light power terminal, a second light power terminal, and a common ground terminal such that light sources 54 are operated by separate power terminals and share a common ground terminal.

In one embodiment, first light source 54A is light-emitting diode ("LED") and, more particularly, is a first bi-color blue/red LED. Alternatively, first light source 54A may be a single color LED, such as a blue LED. Additionally, second light source 54B also may be an LED and, more particularly, is a second bi-color blue/red LED. Alternatively, second light source 54B may be a single color LED, such as a red LED. First and second light sources 54A and 54B are optically coupled to diffuser 42 to distribute light in a uniform pattern on display screen 44. In an alternative embodiment, light sources 54 of display unit 20 may include a third light source, for example a green LED. In this way, the green, blue, and red colors of light sources 54 may be displayed as single colors on display screen 44 or may be combined to form a generally infinite number of colors along the complete color spectrum.

First and second light sources 54A and 54B of the exemplary embodiment serve as a backlight for display screen 44. In one embodiment, display unit 20 operates in a twisted nematic ("TN") positive mode, and more particularly in a TN positive gray mode, in which the symbols visible on display screen 44 are displayed or illuminated in a color other than the backlight color of display screen 44. For example, the symbols may be segmented numbers constantly displayed in a white, gray, or black color, whereas the backlighting of display screen 44 may be illuminated in blue color, red color, or any combination color thereof along the blue-red gradient, such as purple or magenta. Conversely, in a further embodiment, display screen 44 may be a color LCD screen for displaying complete graphical symbols, rather than segmented portions of a symbol. By using a color LCD screen, both the color of the graphical symbol and the color of the backlighting on display screen 44 may be changed according to the colors of light sources 54 or a combination thereof.

Additionally, in a further alternative embodiment, display unit 20 may include an organic LED or O-LED, which combines light sources 54 and display screen 44 into a single component. As such, the various colors of light sources 54 (e.g., blue, red, and/or green) may be used to define the colors of any symbols on the O-LED screen, for example an alphanumeric symbol, rather than defining the color of the backlighting.

In operation, when fluid delivery device is turned on, water will flow therefrom. The user may adjust the temperature of the water by providing an input to user interface 16. For example, the user may depress push button 18A, rotate knob 18B, turn handle 18C, and/or rotate dial 18D in order to adjust the water temperature. As the water temperature changes, the backlight color of display unit 20 changes to a color that generally corresponds to the temperature of the water. For example, according to the exemplary embodiment, a blue backlight color may indicate cold water and a red backlight color may indicate hot water. As such, the color of the symbols on display screen 44 of display unit 20 will remain constant, however, the color of the backlighting of display unit 20 will change in response to the change in temperature.

Figure 14:
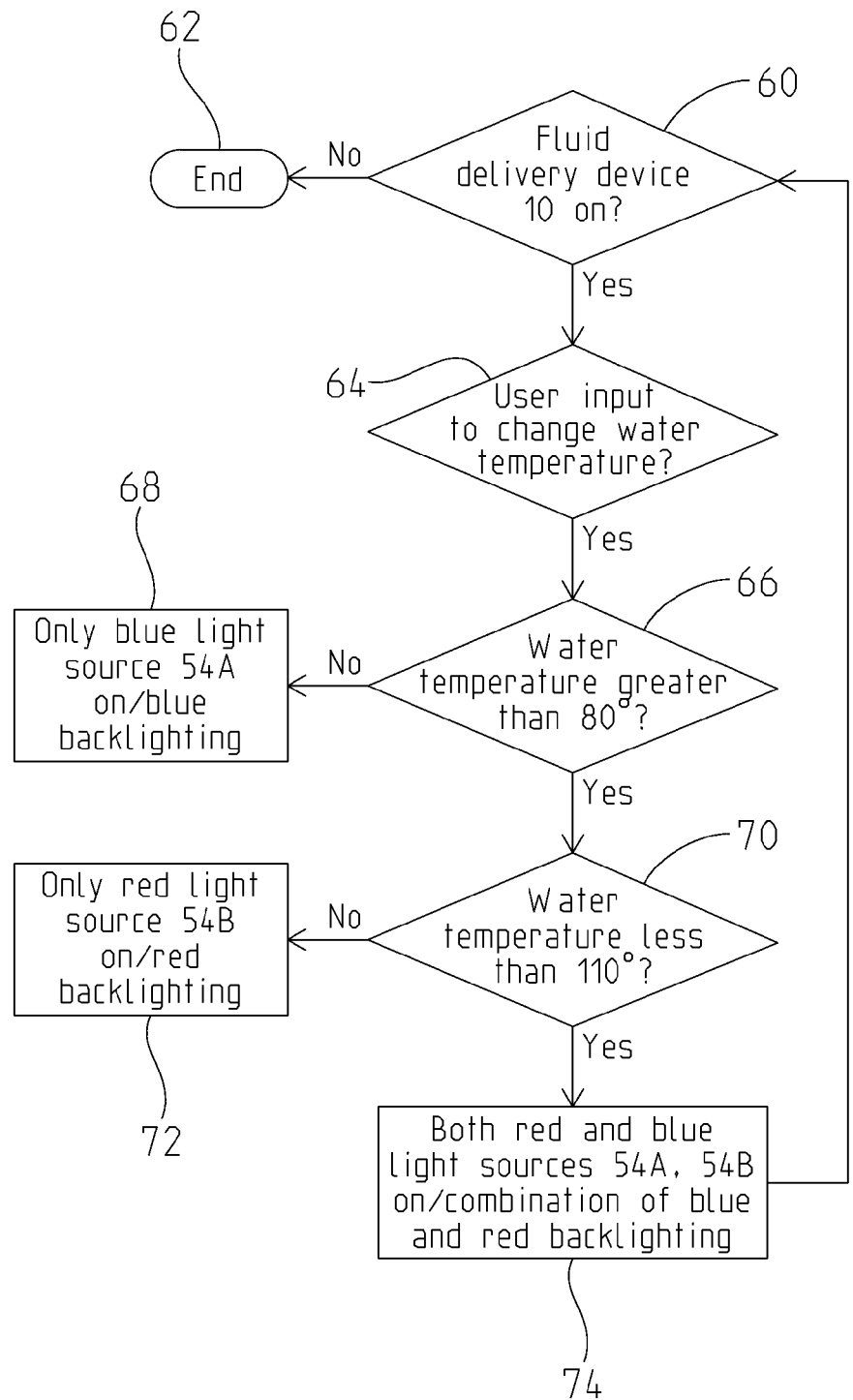
FIG. 14 is a diagrammatic view of an illustrative method of operation of the fluid delivery device of FIG. 13, illustrating a plurality of inputs and at least one output.

More particularly, as shown in FIGS. 13 and 14, in operation, a step 60 will determine if fluid delivery device 10 is on. If fluid delivery device 10 is off, the process will end at step 62. However, if fluid delivery device 10 is on and the user activates one of user inputs 18 to adjust the temperature of the water, as shown in step 64, temperature sensor 22 will measure the temperature of the water and send a signal to controller 24. Once controller 24 receives the signal indicating the water temperature, controller 24 sends a signal to light sources 54 on display unit 20 to adjust the color of the backlight of display screen 44. For example, as shown in FIG. 14, if the user adjusts fluid delivery device 10 to deliver only cold water, for example water with a temperature less than approximately 80° F. (as shown in step 66), controller 24 will send a signal to display unit 20 to activate or turn on only first light source 54A via the first light ground terminal extending through first terminal hole 52A. Alternatively, controller 24 may send a signal to both first and second light sources 54A and 54B to activate only a portion of each light source 54A, 54B (e.g., only one color portion, such as the blue color portion). In this way, the backlighting of display screen 44 is only blue and the user sees only blue backlighting on display unit 20 when the temperature of the water is less than or equal to approximately 80° F., as shown in step 68. Alternatively, if first light source 54A is a color other than blue, the color of the backlighting of display screen 44 also will be that color, rather than blue, when the temperature of the output water is less than or equal to approximately 80° F.

However, in step 66, if the user activates one of user inputs 18 to increase the temperature of the water to a temperature greater than 80° F. and less than 110° F., temperature sensor 22 will determine the temperature of the water and send a signal to controller 24 in step 70. The temperature input to controller 24 causes controller 24 to send a signal to display screen 44 and first and/or second light sources 54A, 54B to backlight display screen 44. More particularly, controller 24 sends a signal to second light source 54B via the second light ground terminal extending through second terminal hole 52B and the common power terminal extending through third terminal hole 52C to activate or turn on second light source 54B to backlight display screen 44. Alternatively, controller 24 may send a signal to both first and second light sources 54A and 54B to activate all portions of each light source 54A, 54B (e.g., both color portions, such as the blue and red color portions). As such, both blue and red backlighting will be activated via first and second light sources 54A and 54B. With both first and second light sources 54A and 54B turned on when the water temperature is greater than 80° F. and less than 110° F., the backlighting of display unit 20 will be a combination of blue and red colors, for example purple, magenta, or any other color along the blue-red gradient, as shown in step 74. In one embodiment, when the temperature of the water is greater than 80° F. but less than approximately 95° F., the backlight color may be a combination of blue and red which includes more blue than red, for example dark purple or indigo. However, when the temperature of the water is greater than approximately 95° F. and less than approximately 110° F., the backlight color of display screen 44 may be a combination of blue and red which includes more red than blue, for example magenta, orchid, or other shades purple. It may be appreciated that as the temperature of the water increases, the intensity of the red backlighting color begins to overcome the intensity of the blue backlighting color to visually signal to the user that the temperature of the water is increasing. In this way, the color of the backlighting of display unit 20 successively and gradually changes along the blue-red gradient such that a generally infinite number of color combinations within the blue-red gradient may be possible as the temperature of the water is adjusted. As the backlighting color of display unit 20 changes in response to the water temperature, the color of the symbols on display unit do not change and may a remain constant color, for example, white, black, gray, or any other color that is visible with a backlighting color within the blue-red gradient. In the alternative embodiment which includes three light sources 54, the backlighting color of display unit 20 is not limited to a color along the blue-red gradient, but instead, may be changed to any color within the complete color spectrum. In the further alternative embodiment which includes an O-LED, the symbols on display screen 44 may change color, rather than the backlighting thereof.

If the user continues to increase the temperature of the water such that fluid delivery device 10 outputs only hot water, for example water at a temperature greater than or equal to approximately 110° F., controller 24 will send a signal to display unit 20 to activate or turn on only second light source 54B via the second light ground terminal extending through second terminal hole 52B to backlight display screen 44, as shown in step 72. If the water was previously at a temperature less than 110° F., controller 24 will simultaneously send a signal to deactivate or turn off first light source 54A via the first light source ground terminal extending through first terminal hole 52A. Alternatively, controller 24 may send a signal to both first and second light sources 54A and 54B to activate only a portion of each light source 54A, 54B (e.g., only one color portion, such as the red color portion). In this way, the backlighting of display screen 44 is only red when fluid delivery device 10 outputs hot water and the user sees only red backlighting on display unit 20. Alternatively, if second light source 54B is a color other than red, the color of the backlighting of display screen 44 also will be that color, rather than red, when the temperature of the output water is at least approximately 110° F.

Although the invention has been described in detail with reference to certain preferred embodiments, variations and modifications exist within the spirit and scope of the invention as described and defined in the following claims.

The invention claimed is:

1. A fluid delivery device configured to output water comprising:
   a temperature sensor for detecting temperature of the output water;
   a controller electrically coupled to the temperature sensor;
   a display unit electrically coupled to the controller and including a first light source configured to be operated by the controller to adjust backlighting of the display unit,
   the controller being configured to receive a signal from the temperature sensor and send at least one signal to the first light source in response to the signal from the temperature sensor; and
   a second light source configured to be operated by the controller to adjust the backlighting of the display unit, and the controller is configured to receive the signal from the temperature sensor and send at least one signal to at least one of the first and second light sources in response to the signal from the temperature sensor;
   wherein the controller causes the first light source to generate light of a first color when the signal from the temperature sensor detects a first water temperature, the second light source to generate light of a second color when the signal from the temperature sensor detects a second water temperature greater than the first water temperature, and the first and second light sources to blend the light of the first color and the light of the second color and generate light of a third color when the signal from the temperature sensor detects a third water temperature between the first water temperature and the second water temperature.

2. The fluid delivery device of claim 1, wherein the first light source is a first blue/red bi-color light-emitting diode ("LED") and the second light source is a second blue/red bi-color LED.

3. The fluid delivery device of claim 2, wherein the controller is configured to adjust the backlighting of the display unit to a blue color when the temperature of the water is less than approximately 80° F.

4. The fluid delivery device of claim 3, wherein the controller is configured to adjust the backlighting of the display unit to a red color when the temperature of the water is at least approximately 110° F.

5. The fluid delivery device of claim 4, wherein the controller is configured to adjust the backlighting of the display unit to a color which includes red and blue when the temperature of the water is approximately 80° F.-approximately 110° F.

6. A method of controlling a backlighting output on a fluid delivery device configured to deliver water comprising the steps of:
   providing a display unit on the fluid delivery device;
   electrically coupling a first light source defining a first color to the display unit;
   electrically coupling a second light source defining a second color to the display unit;
   providing a controller configured to adjust an output of the first and second light sources;
   sending a first signal from the controller to the first light source to adjust the backlighting output of the fluid delivery device to the first color when a temperature of the water is less than a first temperature;
   sending a second signal from the controller to at least the second light source to adjust the backlighting output of the fluid delivery device to include the second color when the temperature of the water is greater than a second temperature, the second temperature being greater than the first temperature;
   electrically coupling a temperature sensor to the controller; and
   measuring the temperature of the water with the temperature sensor;
   wherein the controller causes the first and second light sources to blend the light of the first color and the light of the second color and generate light of a third color when the temperature of the water is between the first water temperature and the second water temperature.

7. The method of claim 6, further comprising the step of sending a signal from the controller to the second light source to adjust the backlighting output of the fluid delivery device to the second color when the temperature of the water is at a maximum temperature.

8. The method of claim 7, wherein the first temperature is approximately 80° F.

9. The method of claim 8, wherein the maximum temperature is at least approximately 110° F.

10. The method of claim 6, wherein the first color is blue and the second color is red.

11. The fluid delivery device of claim 1, further comprising a printed circuit board electrically coupled to the first light source, the second light source, and the display unit.

12. The fluid delivery device of claim 11, further comprising an escutcheon configured to be supported on a shower enclosure, the display unit being supported within an opening of the escutcheon.

13. The fluid delivery device of claim 1, wherein the first color is blue, the second color is red, and the third color is a blend along a blue-red color gradient.

14. The method of claim 6, further comprising the step of providing a printed circuit board electrically coupled to the first light source, the second light source, and the display unit.

15. The method of claim 14, further comprising the steps of mounting an escutcheon on a shower enclosure, and supporting the display unit within the escutcheon.

16. The method of claim 6, wherein the first color is blue, the second color is red, and the third color is a blend along a blue-red color gradient.

* * * * *